(12) United States Patent
Hodjat et al.

(10) Patent No.: US 10,883,575 B2
(45) Date of Patent: Jan. 5, 2021

(54) TENSIONER

(71) Applicant: GATES CORPORATION, Denver, CO (US)

(72) Inventors: Yahya Hodjat, Oxford, MI (US); Lynda Elsas, Troy, MI (US)

(73) Assignee: Gates Corporation, Denver, CO (US)

( * ) Notice: Subject to any disclaimer, the term of this patent is extended or adjusted under 35 U.S.C. 154(b) by 133 days.

(21) Appl. No.: 15/861,387

(22) Filed: Jan. 3, 2018

(65) Prior Publication Data

US 2019/0203810 A1 Jul. 4, 2019

(51) Int. Cl.
*F16H 7/08* (2006.01)
*F16H 7/12* (2006.01)

(52) U.S. Cl.
CPC ............. *F16H 7/08* (2013.01); *F16H 7/1209* (2013.01); *F16H 7/1218* (2013.01); *F16H 2007/081* (2013.01); *F16H 2007/0865* (2013.01); *F16H 2007/0878* (2013.01); *F16H 2007/0893* (2013.01)

(58) Field of Classification Search
CPC . F16H 7/08; F16H 7/12; F16H 7/1209; F16H 7/1218; F16H 7/1281; F16H 2007/0865; F16H 2007/0878; F16H 2007/0893; F16H 2007/081
USPC ....................................................... 474/135
See application file for complete search history.

(56) References Cited

U.S. PATENT DOCUMENTS

| | | | |
|---|---|---|---|
| 1,645,576 A | 10/1927 | Beconnier | |
| 4,696,663 A | 9/1987 | Thomey et al. | |
| 5,354,242 A | 10/1994 | St. John | |
| 5,632,697 A | 5/1997 | Serkh | |
| 5,647,813 A | 7/1997 | Serkh | |
| 5,964,674 A | 10/1999 | Serkh et al. | |
| 6,497,632 B2* | 12/2002 | Ayukawa | F16H 7/1218 474/135 |
| 6,609,988 B1 | 8/2003 | Liu et al. | |
| 7,004,863 B2 | 2/2006 | Serkh et al. | |
| 8,142,314 B2* | 3/2012 | Antchak | F16H 7/1218 474/135 |
| 2002/0010045 A1 | 1/2002 | Serkh | |
| 2003/0119616 A1 | 6/2003 | Meckstroth et al. | |

(Continued)

FOREIGN PATENT DOCUMENTS

| | | | |
|---|---|---|---|
| DE | 4029940 A1 | 3/1992 | |
| DE | 19647224 A1 | 5/1997 | |

(Continued)

OTHER PUBLICATIONS

European Patent Office, International Search Report and Written Opinion of the International Searching Authority, International Application No. PCT/US2018/067667, dated Mar. 4, 2019.

*Primary Examiner* — Michael R Mansen
*Assistant Examiner* — Raveen J Dias
(74) *Attorney, Agent, or Firm* — Paul N. Dunlap, Esq; Alyssa K. Sandrowitz, Esq

(57) ABSTRACT

A tensioner comprising a base, a pivot arm pivotally engaged with the base, a pulley journalled to the pivot arm, a torsion spring engaged between the base and the pivot arm, the torsion spring comprising a planar cylindrical portion integrally formed into an end of the torsion spring, and a damping member engaged with the planar cylindrical portion, the damping member frictionally engaging the base and being loaded in an unwinding direction.

6 Claims, 4 Drawing Sheets

(56) References Cited

U.S. PATENT DOCUMENTS

| | | | | |
|---|---|---|---|---|
| 2007/0249446 A1* | 10/2007 | Hao | ............... | F16H 7/1218 |
| | | | | 474/135 |
| 2010/0113201 A1* | 5/2010 | Lannutti | ............... | F16H 7/1218 |
| | | | | 474/135 |
| 2011/0015017 A1* | 1/2011 | Serkh | ............... | F16H 7/1218 |
| | | | | 474/135 |
| 2011/0201466 A1* | 8/2011 | Ishida | ............... | F16H 7/1218 |
| | | | | 474/113 |
| 2014/0287860 A1* | 9/2014 | Ma | ............... | F16H 7/1218 |
| | | | | 474/135 |
| 2015/0247558 A1* | 9/2015 | Hamers | ............... | F16H 7/1218 |
| | | | | 474/117 |
| 2015/0369346 A1* | 12/2015 | Sisodia | ............... | F16H 7/1209 |
| | | | | 474/135 |
| 2016/0146313 A1* | 5/2016 | Ma | ............... | F16H 7/1218 |
| | | | | 474/135 |
| 2017/0016517 A1* | 1/2017 | Ward | ............... | F16H 7/0838 |
| 2020/0124143 A1* | 4/2020 | Hodjat | ............... | F16H 7/08 |

FOREIGN PATENT DOCUMENTS

| | | | |
|---|---|---|---|
| DE | 102010019066 A1 | 11/2011 | |
| DE | 102012223576 A1 | 6/2014 | |
| EP | 0636815 A1 | 2/1995 | |
| WO | WO-2011138100 A1 * | 11/2011 | ........... F16H 7/1218 |
| WO | 2014183200 A1 | 11/2014 | |

\* cited by examiner

TENSIONER

FIELD OF THE INVENTION

The invention relates to a tensioner, and more particularly, to a tensioner having a torsion spring comprising a planar cylindrical portion integrally formed into an end of the torsion spring.

BACKGROUND OF THE INVENTION

Belt tensioners are used to impart a load on a belt. The belt load prevents the belt from slipping on one or more entrained pulleys during operation. Typically the belt is used in an engine application for driving various accessories associated with the engine. For example, an air conditioning compressor and alternator are two of the accessories that may be driven by a belt drive system.

A belt tensioner comprises a pulley journalled to an arm. A spring is connected between the arm and a base. The spring may also engage a damping mechanism. The damping mechanism comprises frictional surfaces in contact with each other. The damping mechanism damps an oscillatory movement of the arm caused by operation of the belt drive. This in turn enhances belt life expectancy.

Representative of the art is U.S. Pat. No. 7,004,863 which discloses an asymmetric damping mechanism for use in a belt tensioner. The damping mechanism comprises two parts having substantially similar arcuate shapes for engaging a tensioner. The first part is in contact with the second part at a pivotable point of contact. The point of contact position is determined according to the desired asymmetric damping factor. The first part is also in contact with a spring. The second part is in contact with a tensioner arm. The damping mechanism also comprises two damping shoes, each having a damping band. The damping band is joined to the damping shoe by a plurality of vertical grooves on the damping shoe cooperating with a plurality of grooves on the damping band. The damping mechanism has an asymmetric damping factor in the range of approximately 1.5 to 5.

What is needed is a tensioner having a torsion spring comprising a planar cylindrical portion integrally formed into an end of the torsion spring. The present invention meets this need.

SUMMARY OF THE INVENTION

The primary aspect of the invention is to provide a tensioner having a torsion spring comprising a planar cylindrical portion integrally formed into an end of the torsion spring.

Other aspects of the invention will be pointed out or made obvious by the following description of the invention and the accompanying drawings.

The invention comprises a tensioner comprising a base, a pivot arm pivotally engaged with the base, a pulley journalled to the pivot arm, a torsion spring engaged between the base and the pivot arm, the torsion spring comprising a planar cylindrical portion integrally formed into an end of the torsion spring, and a damping member engaged with the planar cylindrical portion, the damping member frictionally engaging the base and being loaded in an unwinding direction.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
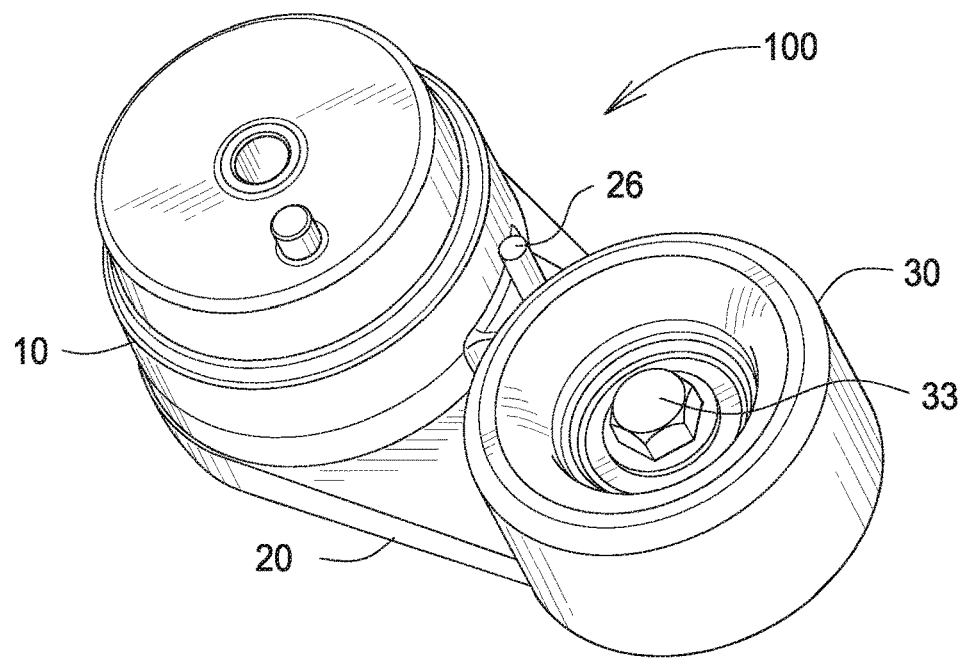
FIG. 1 is a perspective view of the tensioner.

FIG. 1 is a perspective view of the tensioner. Tensioner 100 comprises a base 10 and pivot arm 20. Pivot arm 20 pivots about base 10. A pulley 30 is journalled to an end of pivot arm 20. Pulley 30 engages a belt (not shown).

Figure 2:
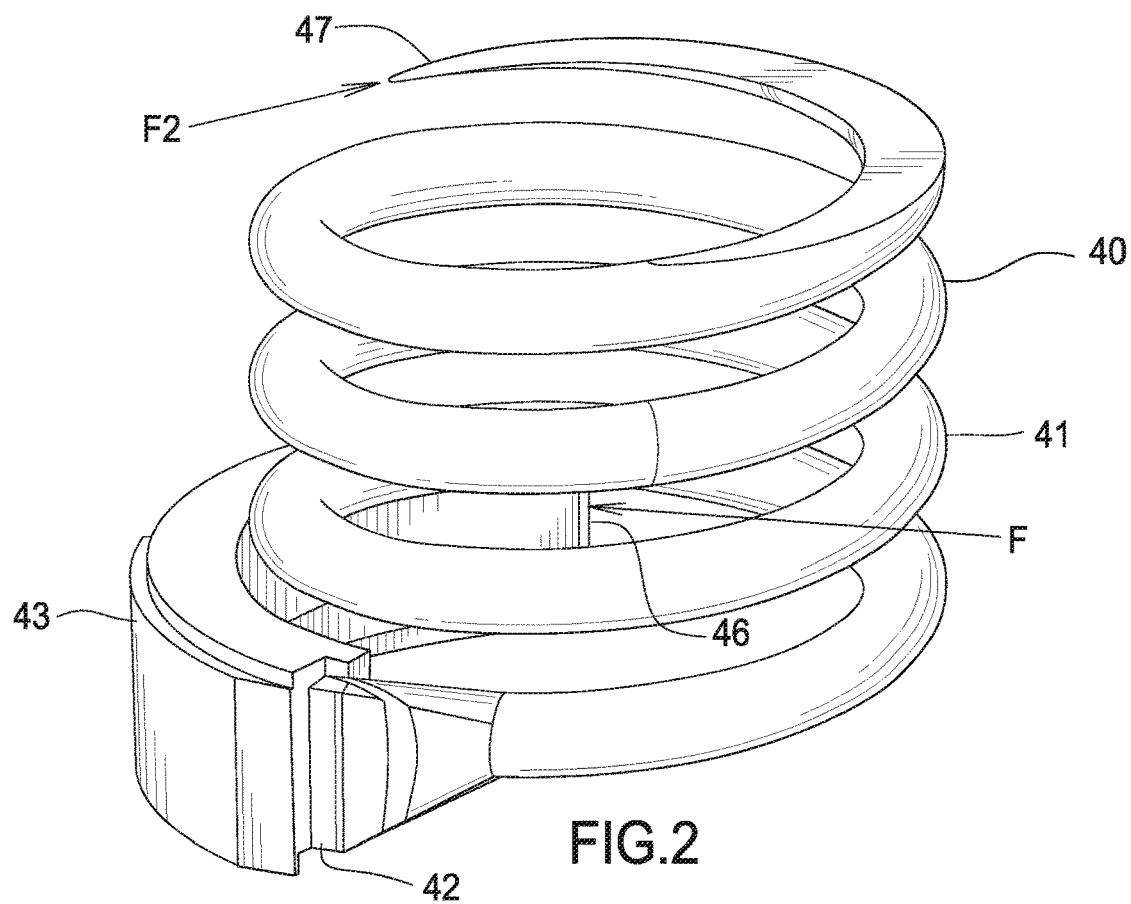
FIG. 2 is a perspective view of the spring and damper.
Figure 4:
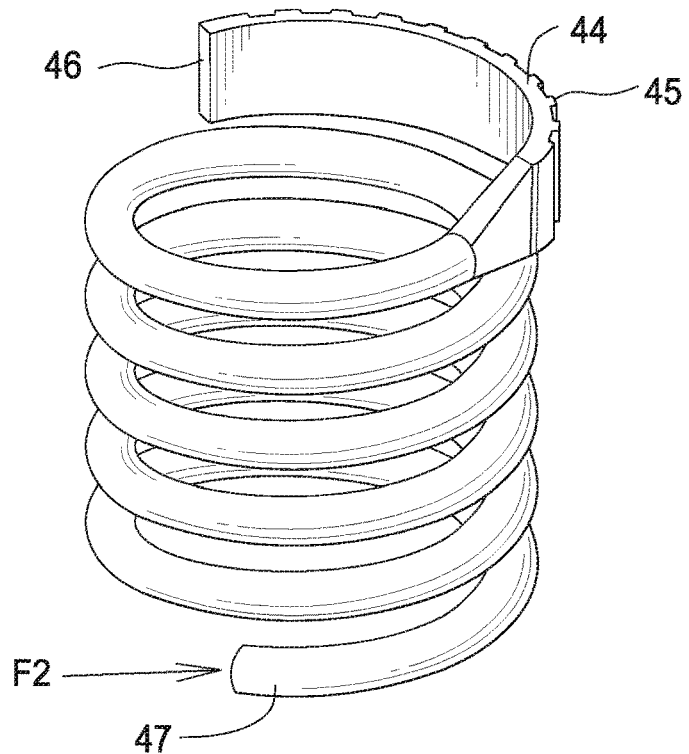
FIG. 4 is a perspective view of the spring.

FIG. 2 is a perspective view of the spring and damper. Spring 40 is a torsion spring comprising multiple volutes 41. End 42 comprises a cylindrical section 44 to which a damping member 43 is attached. The cylindrical section 44 of end 42 is planar and has an arcuate curve with a center of curvature located approximately on the pivot arm pivot axis A-A. Section 44 has an arc length of less than approximately 180 degrees and preferably an arc length in the range of approximately 90 degrees to approximately 120 degrees. Section 44 is forged or in the alternative, stamped, machined or fabricated into the end of spring 40 by any suitable method known in the art, hence, end 42 is an integral part of spring 40, and section 44 is different in shape from the rest of spring 40, as shown in FIG. 4.

Damping member 43 is either press fit or over-molded to end 42 and section 44. Damping member 43 comprises material suitable to provide a frictional engagement with a cooperating surface such as the base. Damping member damps an oscillatory movement of pivot arm 20 while in operation. Damping member 43 and spring 40 comprise a unitary assembly.

Figure 3:
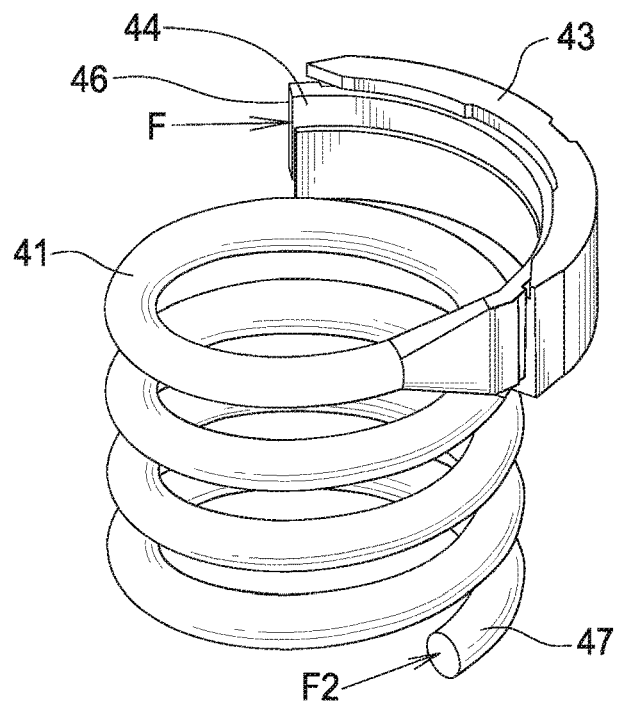
FIG. 3 is a perspective view of the spring and damper.

FIG. 3 is a perspective view of the spring and damper. Section 44 allows for a uniform loading of damping member 43. This in turn enhances operation of damping member 43 by loading the entire frictional surface of damping member 43 with a normal force, which in turn generates a desired frictional force.

End 47 of spring 40 bears upon base 10. Spring 40 is loaded in an unwinding direction when in use.

FIG. 4 is a perspective view of the spring. Section 44 comprises ribs 45 which provide relief to the surface of section 44. Ribs 45 provide a secure fixation for damping member 43 to end 42.

Figure 5:
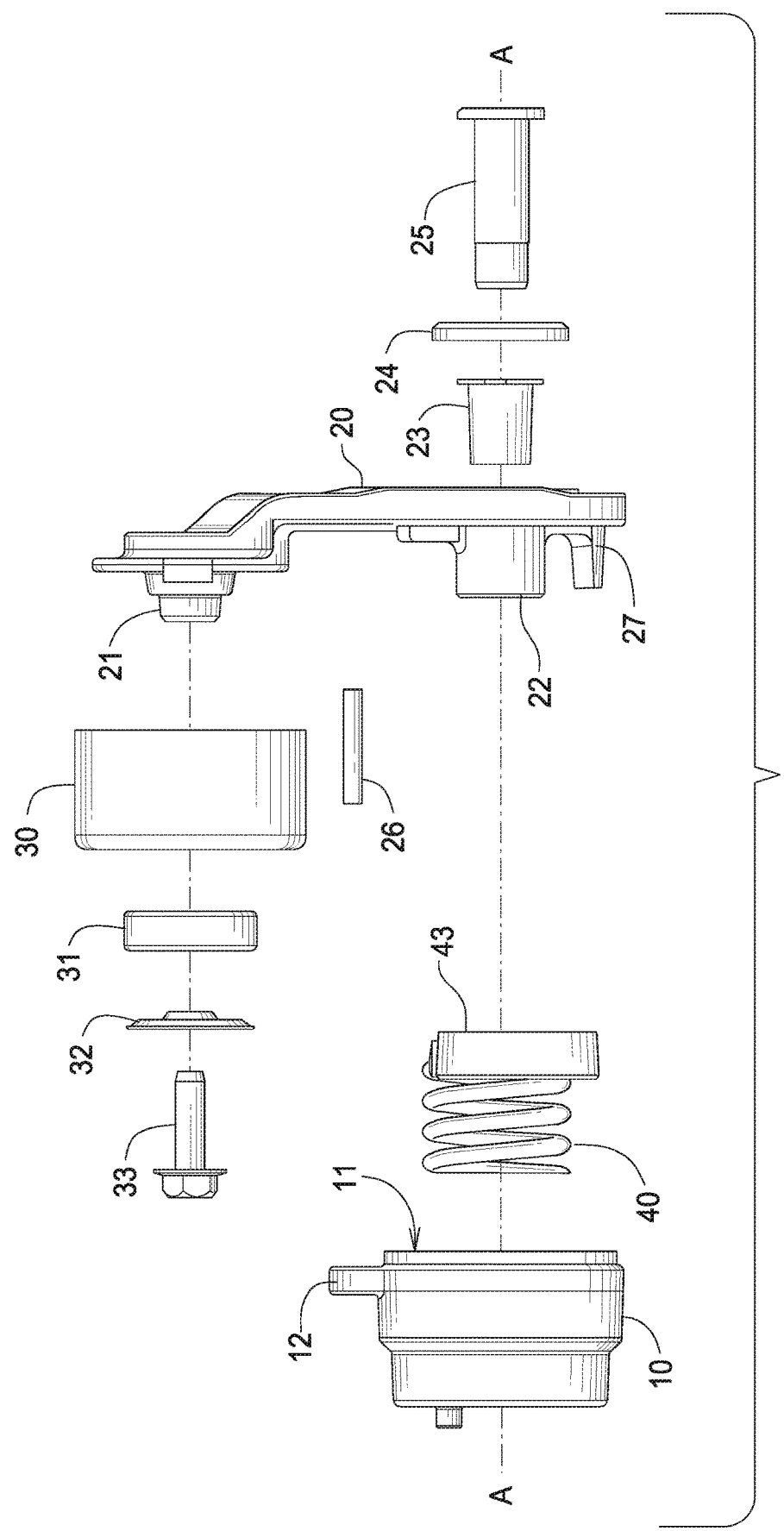
FIG. 5 is an exploded view of the tensioner.

FIG. 5 is an exploded view of the tensioner. Pulley 30 is journalled to pivot arm 20 on a bearing 31. Dust shield 32 prevents debris from entering bearing 31. Bolt 33 secures pulley 30 to receiving portion 21 on pivot arm 20.

Shaft 25 is press fit into base 10 through portion 22. Pivot arm 20 pivots about shaft 25 on a bushing 23. Dust shield 24 prevents debris from entering bushing 23.

Portion 27 of pivot arm 20 engages end 46 of section 44. A force F is applied to end 46 by a pivot action of the pivot arm. A reaction force F2 is applied by base 10 to the other end of spring 40. Force F causes damping member 43 to frictionally engage base 10.

Figure 6:
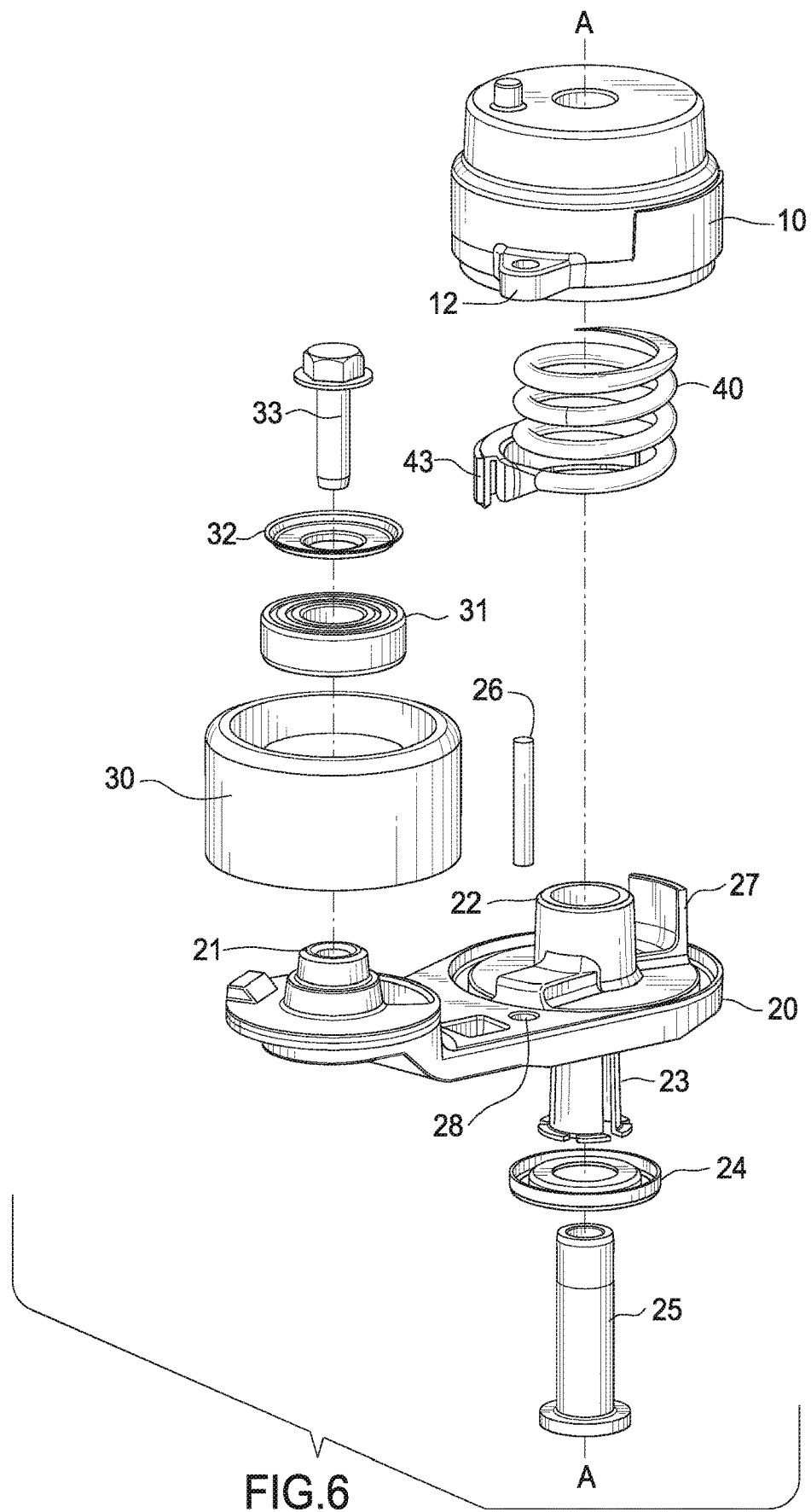
FIG. 6 is a perspective exploded view of the tensioner.

FIG. 6 is a perspective exploded view of the tensioner. Damping member 43 frictionally engages an inner surface 11 of base 10.

Removable member 26 engages a hole 28 in pivot arm 20 and receiving portion 12 in base 10. Member 26 allows pivot arm 20 to be held in a preloaded position during installation of the tensioner. During installation a belt (not shown) is routed on an accessory drive (not shown). The belt is put in contact with pulley 30 during installation. Once the belt is installed member 26 is removed thereby allowing pivot arm 20 to come into contact with and to load the belt. Loading the belt in this manner prevents the belt from slipping during operation, thereby assuring proper noise-free operation.

A tensioner comprising a base, a pivot arm pivotally engaged with the base, a pulley journalled to the pivot arm, a removable member disposed between the base and the pivot arm, a torsion spring engaged between the base and the pivot arm for biasing the pivot arm, the torsion spring loaded in an unwinding direction, and a damping member integrally fixed to a planar end of the torsion spring, the damping member engaging the base and damping an oscillatory movement of the pivot arm.

Although forms of the invention have been described herein, it will be obvious to those skilled in the art that variations may be made in the construction and relation of parts and method without departing from the spirit and scope of the invention described herein.

We claim:

1. A tensioner comprising:
   a base;
   a pivot arm pivotally engaged with the base;
   a pulley journalled to the pivot arm;
   a removable member disposed between the base and the pivot arm;
   a torsion spring engaged between the base and the pivot arm for biasing the pivot arm, the torsion spring loaded in an unwinding direction and having an arcuate planar end different in shape from the rest of the torsion spring; and
   a damping member integrally fixed to the arcuate planar end of the torsion spring, the damping member frictionally engaging the base and damping an oscillatory movement of the pivot arm.

2. The tensioner as in claim 1, wherein
   the arcuate planar end comprises a planar cylindrical portion.

3. The tensioner as in claim 2, wherein the planar cylindrical portion comprises a rib for fixing the damping member.

4. The tensioner as in claim 2, wherein the planar cylindrical portion has a center of curvature about a pivot arm pivot axis A-A.

5. The tensioner as in claim 2, wherein the damping member frictionally engages the base.

6. The tensioner as in claim 2, wherein the damping member is overmolded to the planar cylindrical portion.

* * * * *